Figure 1:
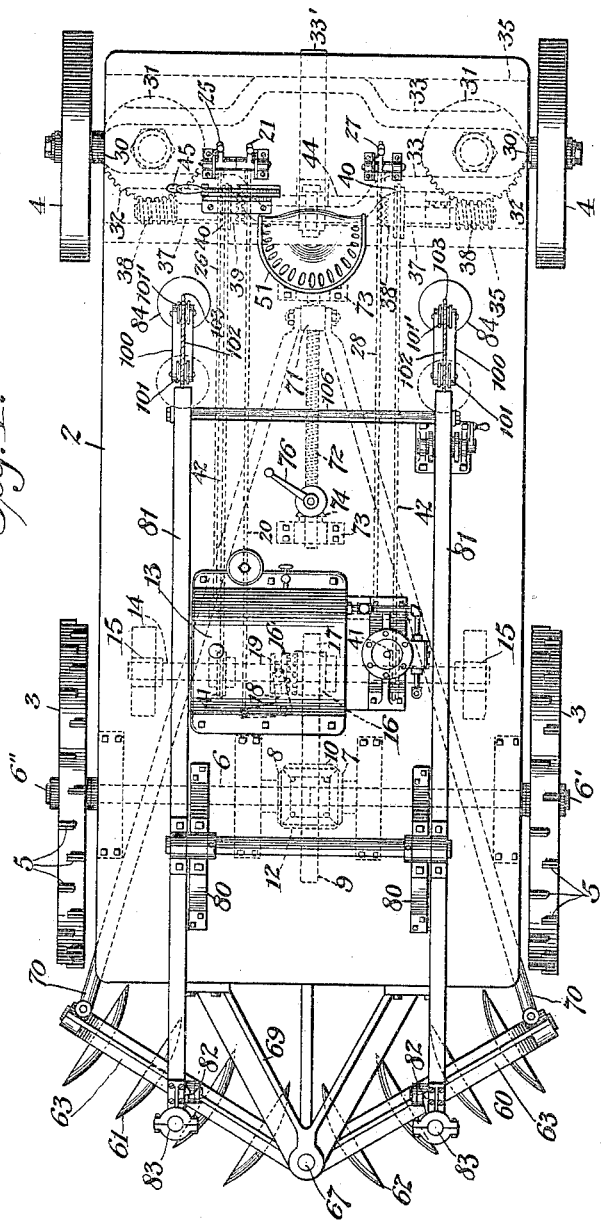

No. 660,098. Patented Oct. 23, 1900.
R. J. GATLING.
MOTOR DRIVEN VEHICLE.
(Application filed Mar. 2, 1900.)
(No Model.)
3 Sheets—Sheet 1.

Witnesses:—

Inventor:
Richard J. Gatling
By his Attorney
F. A. Richards.

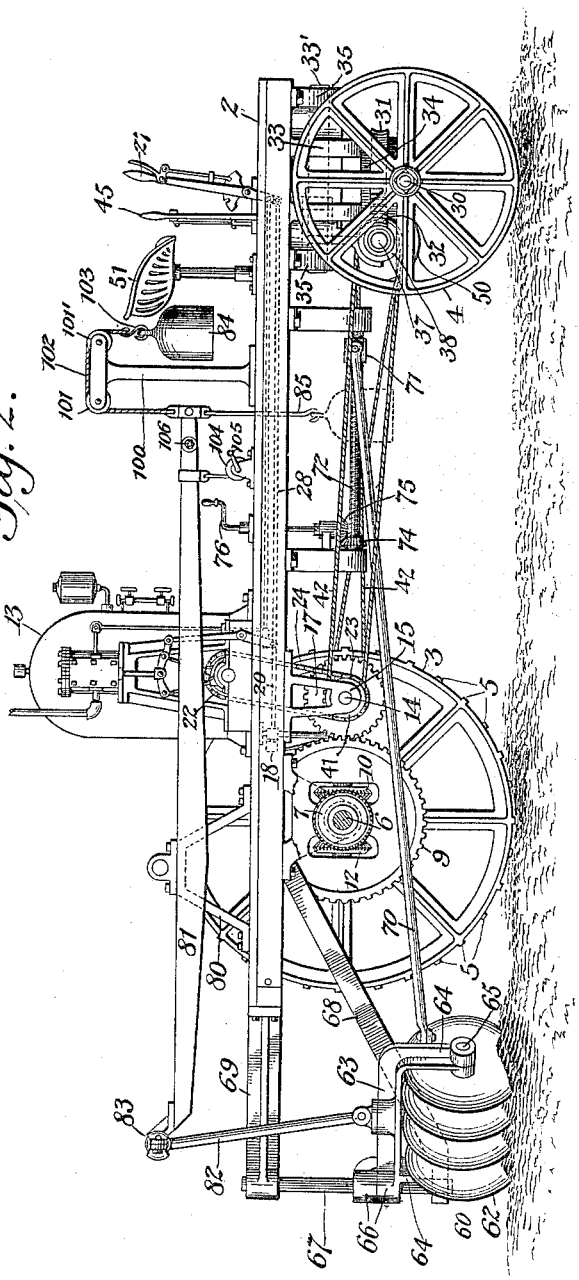

No. 660,098.  
R. J. GATLING.  
MOTOR DRIVEN VEHICLE.  
(Application filed Mar. 2, 1900.)  
Patented Oct. 23, 1900.
(No Model.)  
3 Sheets—Sheet 3.
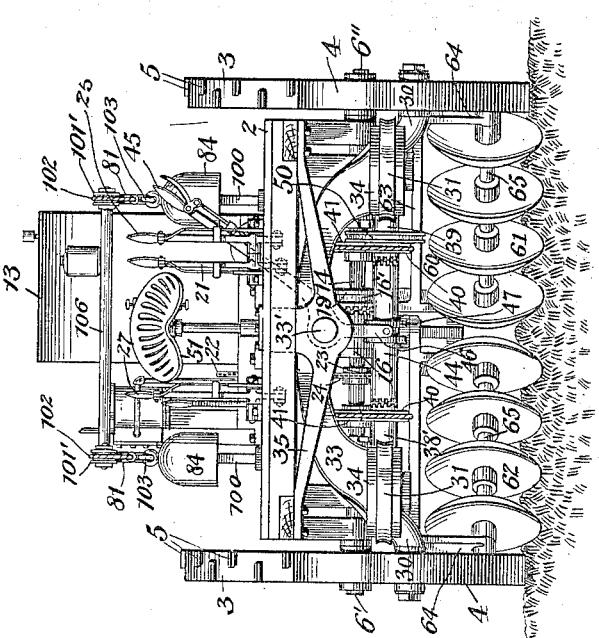
Witnesses:
Inventor  
Richard J. Gatling,  
By his Attorney,  
F. H. Richards.

UNITED STATES PATENT OFFICE.

RICHARD J. GATLING, OF NEW YORK, N. Y.

MOTOR-DRIVEN VEHICLE.

SPECIFICATION forming part of Letters Patent No. 660,098, dated October 23, 1900.

Original application filed September 15, 1899, Serial No. 730,552. Divided and this application filed March 2, 1900. Serial No. 7,052. (No model.)

*To all whom it may concern:*

Be it known that I, RICHARD J. GATLING, a citizen of the United States, residing in New York, in the county of New York and State of New York, have invented certain new and useful Improvements in Motor-Driven Vehicles, of which the following is a specification.

This invention relates to agricultural implements, and more particularly to an improved motor-driven vehicle for carrying soil-working instrumentalities—such, for instance, as disks—and the present application is a division of that filed September 15, 1899, Serial No. 730,552, in so far as the features claimed herein are concerned.

The object of the invention is to provide an improved mechanically-driven vehicle embodying improved means for controlling the working thereof, and which vehicle is particularly adapted for carrying soil-working devices—such, for instance, as disk plows.

In the drawings accompanying and forming part of this specification, Figure 1 is a top view of this improved vehicle. Fig. 2 is a side view thereof, the body being partly broken away to illustrate the organization more clearly; and Fig. 3 is a front view, and Fig. 4 is a rear view, of the same.

Similar characters of reference designate like parts in all the figures of the drawings.

This improved mechanically-driven vehicle, which is especially adapted for use with disk plows, comprises in a general way some suitable body and running-gear, a gang of disks, shown herein comprising two sets, means for adjusting the disks at various angles, means for raising and lowering the disks, means for determining the depth of their work, means for driving said vehicle and including equalizing means effective to permit one driving-wheel to operate when the other is out of operation and means for controlling such driving means, and means for steering the vehicle. As a preface to a further description of this improved motor-driven plow I desire to state that any suitable body and running-gear may be used, if desired, and that the structure may be used for various purposes. For instance, instead of carrying disk plows it may carry disk harrows or other implements adapted to be connected and effectively operated by a vehicle of this character.

The present motor-driven plow comprises in one form thereof, and which may be its preferred form, if desired, some suitable framework or body, shown herein as a platform 2, mounted on suitable running-gear. The running-gear in the present instance comprises a pair of drivers or rear wheels 3 and a pair of front or steering wheels 4. Each of the drivers is provided with suitable projections 5 on its periphery to prevent the slipping of the same on the ground. Each driving-wheel is suitably mounted on and shown rigidly connected with an axle 6, shown herein as a two-part axle, each member 6' 6" thereof carrying one of said driving-wheels. This two-part axle is suitably journaled on the under side of the platform 2, and each member thereof carries at its inner end a bevel-gear 7 8, rigidly secured thereto. For imparting motion to said two-part axle, and thereby the driving-wheels, a spur-gear 9 is shown loosely mounted on said axle 6, the end of each member 6' 6" of the axle projecting into the gear-hub. Rotatably carried by this spur-gear 9, intermediate its hub and periphery, is a pair of bevel-gears 10 12, carried on short shafts journaled in said spur-gear and meshing with the bevel-gears 7 and 8, carried by the two-part axle. By this construction it will be seen that an equalizing means is provided whereby when one of the driving-wheels meets with an obstruction the other driving-wheel may continue in operation without the breakage or the strain of the mechanism in a manner readily understood. Such an obstruction occurs, for instance, in the turning of the vehicle, whereby one of such wheels may act as a pivot for the turning of the vehicle, thereby to permit such vehicle to be turned in a comparatively narrow space. For imparting motion to these driving-wheels a suitable motor 13 is provided.

While various forms of motors may be used—such as electric, air, or steam— I prefer to use a gasolene-motor or one which can be run by the use of kerosene-oil, since this material can be more readily obtained and carried in those sections of the country where my motor is particularly adapted for use—namely, the large farming sections throughout the West.

A particlar description of the motor mechanism is not deemed necessary, since it forms no inventive part of the present improvement.

Supported on the body, preferably at the under side thereof, is a driving-shaft 14, mounted in suitable journals 15. Loosely mounted on this shaft is a clutch member 16, carrying a spur-gear 17, in mesh with the spur-gear 9, mounted on the driving-wheel axle 6. Splined to this driving-shaft 14 for rotary movement therewith and for shiftable movement longitudinally thereof is the other clutch member 16'. For operating this clutch member 16' suitable means is provided, shown comprising an angle-lever 18, having a bifurcated end in engagement with a collar 19 of the shiftable clutch member 16', the connection being such that said clutch member can rotate with the shaft. This angle-lever is in connection by a suitable connector 20 with a clutch-controlling lever 21, located in position adjacent to the seat of the operator.

The motor is shown provided with a sprocket-wheel 22, in connection with a like sprocket-wheel 23, fixed to said driving-shaft 14 by means of a sprocket-chain 24.

For controlling the operation of the motor a starting-lever 25 is provided, and which is also located in position adjacent to the seat of the operator and is in connection with the motor by a suitable connector 26.

By the organization just described it will be readily seen that the motor may be started and the driving-shaft 14 rotated without driving the vehicle and that after starting the motor the vehicle may be driven by the shifting of the shiftable clutch member 16' into position to engage the loosely-mounted clutch member 16, whereby the spur-gears 9 and 17 will operate the driving-wheels.

Since it is desirable oftentimes to reverse the vehicle, a suitable reversing-lever 27, likewise located in position adjacent to the seat of the operator, is provided and shown in connection with the motor by a connector 28, whereby the motor may be reversed to rotate the driving-shaft 14 in the opposite direction, and consequently the driving-wheel axle and the wheels mounted thereon.

In the present construction the steering-wheels 4, which are of such diameter that they may be readily turned under the platform 2 of the vehicle, are shown rotatably mounted on a two-part axle comprising a pair of short shafts 30, each terminating in a disk-shaped member 31, having a part of its periphery formed as a worm-wheel 32. For carrying these worm-wheel members a suitable bolster 33 is provided, the ends of which terminate in disk-shaped plates 34, to which the worm-wheel members 31 are pivotally bolted. This bolster 33 is shown pivotally secured by a bolt 33' intermediate a pair of cross-irons 35, bolted at the ends thereof to the under side of the platform, whereby the wheels may shift relatively to the body to adjust themselves to any inequalities in the ground.

Mounted on the under side of the platform adjacent to the front wheels is a worm-shaft 37, provided at each end thereof with a worm 38, in engagement with the worm-wheels 32. Loosely mounted on this shaft for rotation independently thereof is a pair of clutch members 38' and 39, each carrying a pulley 40, in connection with a like pulley 41, mounted on the driving-shaft 14 by suitable driving belts or ropes 42, one of which driving-ropes is shown crossed, whereby one of said pulleys 40 will be rotated in one direction while the other is rotating in the opposite direction, so that said worm-shaft may be turned in either direction, according to which of the loosely-mounted clutch members 38' and 39 is engaged by the shiftable clutch member about to be described. Splined on this worm-shaft 37 for rotary movement therewith and for shiftable movement longitudinally thereof is a clutch member 44, shown herein as a sleeve having each end thereof formed as a clutch and adapted to engage one or the other of the loosely-mounted clutch members 38' and 39, according to the direction in which said shiftable clutch member 44 is operated. For throwing this clutch member into engagement with one or the other of said loosely-mounted clutch members 38' and 39 suitable means is provided, shown herein as a steering-lever 45, pivotally mounted on the bolt 33' and having a depending bifurcated arm 46, in engagement with a grooved collar 47, carried by said shiftable clutch member 44, whereby on shifting said steering-lever the clutch member 44 will be operated in one or the other direction to engage one or the other of the loosely-mounted clutch members 38' and 39, whereby motion from the driving-shaft 14 will be imparted to the worm-shaft 37 through the medium of the clutch members 38' and 39 in one or the other directions, according to which loosely-mounted clutch member is engaged, whereby the steering-wheels 4 will be simultaneously shifted, one thrown rearwardly and under the vehicle-body and the other forwardly. Carried on one of these loosely-mounted clutch members is a suitable driving-pulley 50, (see Fig. 3,) which may be connected with any suitable mechanism to be operated, whereby the motor-vehicle may be used as a driving medium for operating other machinery.

A suitable seat 51 is shown in position on the body to enable the operator to control the various operating-levers.

Shown supported by the vehicle, preferably at the rear end thereof, is a gang of adjustable disk plows 60, shown herein comprising two sets 61 and 62, each set supported by a suitable bracket or carrier 63. Each of these carriers is provided with depending members 64, forming bearings for the axle 65 of the disk plows and with a sleeve 66 for the reception of a rod 67, supported at its lower end by an arm 68, the upper end of which is bolted to the under side of the platform, the upper end of said rod being supported by a bracket 69 bolted to the rear end of said platform.

To maintain the disk plows in their adjusted positions, the outer ends of the carriers 63 are shown pivotally secured to connectors 70, the inner ends of which connectors terminate in an internally-threaded sleeve 71, supported on a screw-shaft 72, journaled in suitable depending brackets 73 at the under side of the platform. This shaft carries a bevel-gear 74, in mesh with a bevel-gear 75, carried by a crank 76, the handle of which is located above the platform 2, whereby on turning this crank 76 the sleeve 71 will be shifted by the shaft to thereby adjust the two sets of disk plows into any desired position relatively to each other, angular or otherwise. This construction, moreover, also forms a rigid connection between the vehicle-body and the outer ends of the disk-carriers, thereby to prevent swinging movement or the play thereof while in use. For the purpose of raising and lowering said disk-carriers and thereby the disk plows and also for the purpose of assisting in determining the depth of cut thereof, suitable means is provided, shown herein as means including a changeable weight. This means is shown in duplicate, so that a description of one is deemed sufficient.

Pivotally secured to a suitable support 80 on the upper side of the platform 2 is a beam or arm 81, one end of which is connected to a disk-plow carrier 63 by a rod 82, having a ball-and-socket joint 83 at its upper end and a rotary joint at its lower end, whereby the carriers may be adjusted into any desired position. Carried on the opposite end of this beam is a weight 84, which weight in one position is preferably supported below the platform 2 by a hooked suspension device 85, whereby in this position it will counterbalance the disk plows, and thus facilitate the easy adjustment of the same. This weight is shown as an adjustable or removable weight and may be readily removed from the suspension device and shifted into position to exert its force in an opposite direction upon said beam, thereby to force the disks deeper into the soil, and for this purpose the vehicle-body is shown provided with a standard 100, carrying a pair of pulleys 101 101', over which runs a flexible device, such as a rope 102, secured at one end to said beam and having a hook 103 at its opposite end for the reception of an eye formed on the weight 84.

To shift the beams 81, suitable means is provided, shown herein in the nature of a windlass, comprising a roller 104, mounted on suitable bearings and having a crank 105. This roller has secured thereto one end of a flexible device, the opposite end being secured to one of the beams 81, said beam being connected to its companion beam by a suitable coupling device or rod 106, whereby on the turning of the roller the beams may be raised and lowered in a manner that will be readily understood, thereby to raise and lower the disk plows, the rod 67 constituting the means on which the carriers are shifted.

In practice the carriers may be readily removed from the vehicle-body to permit other working implements to be assembled in place thereof, or the disk plows may be removed from the carriers for a similar purpose.

Having described my invention, I claim—

1. In a motor-driven vehicle, the combination of a vehicle-body; running-gear therefor including a pair of steering-wheels; a pair of fifth-wheels, one in connection with each of said steering-wheels and having a part of its periphery formed as a worm-wheel; a pair of worms in mesh with said worm-wheels; and means for rotating said worms in either direction to steer the vehicle.

2. In a motor-driven vehicle, the combination of a vehicle-body; running-gear therefor including a pair of steering-wheels; a parti-formed worm-wheel in connection with each of said wheels; a pair of worms in mesh with said worm-wheels; and clutch mechanism for rotating said worms in either direction thereby to steer the vehicle.

3. In a motor-driven vehicle, the combination of a vehicle-body; running-gear therefor including a pair of steering-wheels; a pair of fifth-wheels one in connection with each of said steering-wheels and having a part of its periphery formed as a worm-wheel; means for carrying said fifth-wheels and comprising a pivotally-mounted bolster; a pair of worms in mesh with said worm-wheels; and means for rotating said worms in either direction to steer the vehicle.

4. In a motor-driven vehicle, the combination of a vehicle-body; running-gear therefor including a pair of steering wheels; a pair of fifth-wheels one in connection with each of said steering-wheels and having a part of its periphery formed as a worm-wheel; means for carrying said fifth-wheels and comprising a pivotally-mounted bolster; a motor; clutch mechanism in operative connection with said motor and operative to rotate said worms in either direction to steer the vehicle.

5. In a motor-driven vehicle, the combination of a vehicle-body; running-gear therefor including a pair of steering-wheels; a parti-formed worm-wheel in connection with each of said wheels; a shaft mounted on said body and carrying worms in engagement with said worm-wheels; a pair of clutch members loosely mounted on said shaft; a shiftable clutch member splined to said shaft and adapted to independently engage each of said loosely-mounted clutch members; means for shifting said clutch member into engagement with one or the other of said loosely-mounted clutch members; and a motor carried by said vehicle and in operative connection with said loosely-mounted clutch members.

6. In a motor-driven vehicle, the combination, with a vehicle-body and with running-gear therefor comprising driving-wheels and steering-wheels, of a motor carried by the vehicle and in operative connection with the driving-wheels for driving the vehicle; equalizing means for permitting the operation of one of said driving-wheels when the other is thrown out of operation; a parti-formed worm-wheel in connection with each of said steering-wheels; a pair of worms in mesh with said worm-wheel; and means for rotating said worms in either direction to steer the vehicle.

7. In a motor-driven vehicle, the combination, with a vehicle-body and with running-gear therefor comprising driving-wheels and steering-wheels, of a motor carried by the vehicle and in operative connection with the driving-wheels for driving the vehicle; equalizing means for permitting the operation of one of said driving-wheels when the other is thrown out of operation; a parti-formed worm-wheel in connection with each of said steering-wheels; a shaft mounted on said body and carrying worms in engagement with said worm-wheels; and clutch mechanism carried by said shaft and in operative connection with said motor for rotating said worms in either direction to steer the vehicle.

8. The combination of a vehicle-body; running-gear therefor including a pair of steering-wheels; a parti-formed worm-wheel in connection with each of said wheels; a shaft mounted on said body and carrying worms in engagement with said worm-wheels; a pair of clutch members loosely mounted on said shaft; a shiftable clutch member splined to said shaft and adapted independently to engage each of said loosely-mounted clutch members; means for shifting said clutch member into engagement with one or the other of said loosely-mounted clutch members; a driving-shaft mounted on said vehicle; means connecting said driving-shaft with said loosely-mounted clutch members, to effect the rotation thereof in opposite directions; and a motor carried by said vehicle and in operative connection with said driving-shaft.

9. The combination of a vehicle-body; running-gear therefor, including a pair of steering-wheels; a two-part axle for carrying said wheels, each having in connection therewith a parti-formed worm-wheel; means pivotally secured to the body for supporting said axles; a shaft mounted on said vehicle-body and having a pair of worms for engagement with said parti-formed worm-wheels; a pair of loosely-mounted clutch members mounted on said shaft; a shiftable clutch member shiftably secured to said shaft for rotation therewith and adapted independently to engage each of said loosely-mounted clutch members; means for shifting said clutch member; and a motor carried by said vehicle and effective to drive said loosely-mounted clutch members.

10. The combination of a vehicle-body; running-gear therefor, including a pair of steering-wheels; a pair of fifth-wheels one in connection with each of said steering-wheels and having a part of its periphery provided with a worm-wheel; means for carrying said fifth-wheels and comprising a pivotally-mounted bolster; a shaft mounted on said vehicle-body and provided with a pair of worms in engagement with said fifth-wheels; a pair of loosely-mounted clutch members mounted on said shaft and carrying pulleys; a shiftable clutch member also mounted on said shaft for rotary movement therewith and adapted to engage one or the other of said loosely-mounted clutch members; a lever for shifting said clutch member; a motor carried by said vehicle; a driving-shaft mounted on the vehicle and in operative connection with said motor and carrying a pair of pulleys; and belts connecting the driving-shaft pulleys with the loosely-mounted clutch-member pulleys, one of said belts being crossed thereby to operate one of said clutch members in one direction while its companion clutch member is rotated in the opposite direction.

11. In a motor-driven vehicle, the combination, with a vehicle-body and with running-gear therefor comprising a two-part driving-axle, a driving-wheel carried by each part of said axle, and steering-wheels, of a motor carried by the vehicle and in operative connection with the driving-wheels for driving the vehicle; equalizing means carried by said two-part driving-axle for permitting the operation of one of said driving-wheels when the other is thrown out of operation; a pair of fifth-wheels one in connection with each of said steering-wheels and having a part of its periphery formed as a worm-wheel; a pivotally-mounted bolster carrying said fifth-wheels; a pair of worms in mesh with said worm-wheels; and means for rotating said worms in either direction to steer the vehicle, and comprising clutch mechanism in operative connection with said motor.

12. In a motor-driven vehicle, the combination, with a vehicle-body and with running-gear therefor comprising driving-wheels, and steering-wheels, of a motor carried by the vehicle and in operative connection with the driving-wheels for driving said vehicle; equalizing means for permitting the operation of one of said driving-wheels when the other is thrown out of operation; a parti-formed worm-wheel in connection with each of said steering-wheels; a shaft mounted on said body and carrying worms in engagement with said worm-wheel; a pair of clutch members loosely mounted on said shaft; a shiftable clutch member splined to said shaft and adapted to independently engage each of said loosely-mounted clutch members; means for shifting said clutch member into engagement with one or the other of said loosely-mounted clutch members; and means connecting said loosely-mounted clutch members with said motor.

13. The combination of a vehicle-body; a pair of driving-wheels; a two-part driving-axle each member thereof carrying a bevel-gear; a spur-gear loosely mounted on said driving-axle and carrying a bevel-gear in engagement with the axle bevel-gears; a driving-shaft mounted on said body; a loosely-mounted clutch member carried by said driving-shaft and provided with a spur-gear in engagement with the spur-gear of the driving-axle; a shiftable clutch member splined to said driving-shaft; means for shifting said clutch member into and out of engagement with the loosely-mounted clutch member; a motor carried by said vehicle; means connecting said motor with said driving-shaft; a pair of steering-wheels; a pair of fifth-wheels in connection with said steering-wheels and each having a part of its periphery formed as a worm-wheel; means pivotally secured to the vehicle-body for supporting said fifth-wheels; a shaft mounted on said body and having a pair of worms in engagement with said fifth-wheels; a pair of loosely-mounted clutch members mounted on said shaft, each carrying a pulley; means connecting said pulleys with the driving-shaft to effect the rotation of said pulleys in opposite directions; a shiftable clutch member mounted on said shaft for rotation therewith; and means for shifting said clutch member into engagement with one or the other of said loosely-mounted clutch members.

14. The combination of a vehicle-body; a pair of driving-wheels; a two-part driving-axle, each member thereof carrying a bevel-gear; a spur-gear loosely mounted on said driving-axle and carrying a bevel-gear in engagement with the axle bevel-gears; a driving-shaft mounted on said body; a loosely-mounted clutch member carried by said driving-shaft and provided with a spur-gear in engagement with the spur-gear of the driving-axle; a shiftable clutch member splined to said driving-axle; means for shifting said clutch member into and out of engagement with the loosely-mounted clutch member; a motor carried by said vehicle; means connecting said motor with said driving-axle; a pair of steering-wheels; a pair of fifth-wheels in connection with said steering-wheels, and each having a part of its periphery formed as a worm-wheel; means pivotally secured to the vehicle-body for supporting said fifth-wheels; a shaft mounted on said body and having a pair of worms in engagement with said fifth-wheels; a pair of loosely-mounted clutch members mounted on said shaft, each carrying a pulley; means connecting said pulleys with the driving-shaft and effective to rotate said pulleys in opposite directions; a shiftable clutch member mounted on said shaft for rotation therewith; means for shifting said clutch member into engagement with one or the other of said loosely-mounted clutch members; means for starting and stopping the motor; and means for reversing said motor, thereby to reverse the vehicle.

RICHARD J. GATLING.

Witnesses:
EPHRAIM BANNING,
BELLE W. BARRY.